(12) United States Patent
Hinnant et al.

(10) Patent No.: US 11,032,157 B2
(45) Date of Patent: Jun. 8, 2021

(54) ADAPTABLE REAL-TIME COMMUNICATIONS PLUGIN FOR VIRTUAL DESKTOP INFRASTRUCTURE SOLUTIONS

(71) Applicant: Microsoft Technology Licensing, LLC, Redmond, WA (US)

(72) Inventors: Neil R. Hinnant, Seattle, WA (US); Matthew C. Howard, Bothell, WA (US); Rafael Vincent Prieto Vertido, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,160

(22) Filed: May 16, 2019

(65) Prior Publication Data

US 2020/0366565 A1 Nov. 19, 2020

(51) Int. Cl.
*H04L 29/06* (2006.01)
*H04L 12/24* (2006.01)
(Continued)

(52) U.S. Cl.
CPC .............. *H04L 41/22* (2013.01); *G06F 9/452* (2018.02); *G06F 9/547* (2013.01); *H04L 65/1069* (2013.01); *H04L 67/104* (2013.01)

(58) Field of Classification Search
CPC ...... G06F 9/452; G06F 11/1484; G06F 9/547; H04L 65/1069; H04L 67/104; H04L 29/08522
See application file for complete search history.

(56) References Cited

U.S. PATENT DOCUMENTS 9,055,139 B1 6/2015 Devireddy et al.
9,658,866 B2 5/2017 Jorgensen et al.
(Continued)

FOREIGN PATENT DOCUMENTS

EP 2609519 A4 1/2014

OTHER PUBLICATIONS

"International Search Report and Written Opinion Issued in PCT Application No. PCT/US2020/028028", dated Jul. 17, 2020, 11 Pages.

*Primary Examiner* — Shen Shiau
(74) *Attorney, Agent, or Firm* — Arent Fox, LLP

(57) ABSTRACT

A plugin works with a remote desktop client that is executing on a client computing device to present a user interface of a communications application that is executing in a cloud computing environment. The plugin enables the remote desktop client to conduct audio and/or video communication with a remote computing device in a peer-to-peer manner rather than via the communications application. The plugin also enables the remote desktop client to determine a hardware-based media processing capability of the client computing device and leverage such capability in conducting the peer-to-peer audio and/or video communication with the remote computing device. Such hardware-based media processing capability may be used, for example, to process media received from the remote computing device, to process media captured from a media source of the client computing device, or as a basis for negotiating a media communication parameter with the remote computing device.

20 Claims, 6 Drawing Sheets

(51) Int. Cl.
*G06F 9/451* (2018.01)
*G06F 9/54* (2006.01)
*H04L 29/08* (2006.01)

(56) References Cited

U.S. PATENT DOCUMENTS

| | | | |
|---|---|---|---|
| 10,462,216 B1* | 10/2019 | Vysotsky | H04L 65/605 |
| 10,546,037 B2* | 1/2020 | Klug | G06F 16/958 |
| 10,673,939 B2* | 6/2020 | Vysotsky | H04L 67/2814 |
| 10,742,725 B2* | 8/2020 | Vysotsky | H04L 65/80 |
| 10,742,726 B2* | 8/2020 | Vysotsky | H04L 67/104 |
| 10,904,325 B2* | 1/2021 | Vysotsky | H04L 65/4069 |
| 2010/0333151 A1 | 12/2010 | Huang | |
| 2011/0225313 A1 | 9/2011 | Lauwers et al. | |
| 2012/0054640 A1 | 3/2012 | Nancke-Krogh | |
| 2012/0218374 A1 | 8/2012 | Matula et al. | |
| 2012/0317301 A1 | 12/2012 | Lee et al. | |
| 2014/0068007 A1* | 3/2014 | O'Gorman | H04N 7/15 709/219 |
| 2014/0250460 A1 | 9/2014 | Hulse et al. | |
| 2015/0015588 A1 | 1/2015 | Guy | |
| 2016/0378534 A1 | 12/2016 | Oh et al. | |
| 2019/0068390 A1 | 2/2019 | Gross et al. | |
| 2019/0155861 A1* | 5/2019 | Klug | G06F 9/5072 |
| 2019/0340000 A1* | 11/2019 | Vysotsky | G06F 9/452 |
| 2019/0340001 A1* | 11/2019 | Vysotsky | G06F 9/455 |
| 2019/0340002 A1* | 11/2019 | Vysotsky | G06F 9/45529 |
| 2019/0340045 A1* | 11/2019 | Vysotsky | H04L 67/42 |
| 2019/0342362 A1* | 11/2019 | Vysotsky | H04L 67/34 |
| 2019/0342363 A1* | 11/2019 | Vysotsky | G06F 9/455 |
| 2019/0342364 A1* | 11/2019 | Vysotsky | H04L 63/20 |
| 2019/0342365 A1* | 11/2019 | Vysotsky | H04L 67/2804 |
| 2019/0342378 A1* | 11/2019 | Vysotsky | H04L 65/403 |
| 2020/0007643 A1* | 1/2020 | Vysotsky | H04L 61/2575 |
| 2020/0117693 A1* | 4/2020 | Klug | G06F 16/957 |
| 2020/0296154 A1* | 9/2020 | Vysotsky | H04L 67/2804 |

* cited by examiner

ADAPTABLE REAL-TIME COMMUNICATIONS PLUGIN FOR VIRTUAL DESKTOP INFRASTRUCTURE SOLUTIONS

BACKGROUND

Virtualization technology abstracts a desktop operating system (OS) and associated applications from a client computing device used to access them. For example, a virtual desktop infrastructure solution (VDI) may involve hosting a desktop on servers in a data center and delivering an image of the desktop over a network to the client computing device. The desktop image can then be rendered on the client computing device and a user of the client computing device may interact directly with the image as though the desktop and its applications are running locally on the client computing device.

This approach enables customers to streamline management and costs by consolidating and centralizing user desktops. The benefits of centralization include hardware resource optimization, reduced software maintenance, and improved security. For example, software patching and OS migrations can be applied and tested for all users in one instance. Moreover, software assets are centralized and thereby easily monitored and protected, and sensitive data is uncompromised in cases of desktop loss or theft. In addition, desktop virtualization increases users' mobility and the freedom to access virtual desktops from anywhere and any device.

Despite the many benefits afforded by virtualization technologies, some applications, however, may not be optimized for or well-supported in VDI environments. One such example is communications applications running in a VDI environment that enable real-time communications (RTC) between users (e.g., Microsoft® Teams, Slack®). RTC refers to near simultaneous exchange of information (e.g., voice, instant messaging, video, etc.) over a network from the sender to the receiver with negligible latency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for improving the performance of a remote desktop client that is executing on a client computing device to present a user interface (UI) of a communications application that is remotely executing in a cloud computing environment. In embodiments, the methods, systems, and computer program products enable the remote desktop client to conduct audio and/or video communication with a remote computing device in a peer-to-peer manner rather than via the remotely-executing communications application. In further accordance with such embodiments, the methods, systems, and computer program products enable the remote desktop client to determine one or more hardware-based media processing capabilities of the client computing device and leverage such one or more hardware-based media processing capabilities in conducting the peer-to-peer audio and/or video communication with the remote computing device, which can improve the quality of such audio and/or video communication and reduce a processing burden on the client computing device. The one or more hardware-based media processing capabilities may be used, for example, to process media received from the remote computing device for rendering by the client computing device, to process media captured from a media source of the client computing device for transmission to the remote computing device, or as a basis for negotiating a media communication parameter with the remote computing device.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
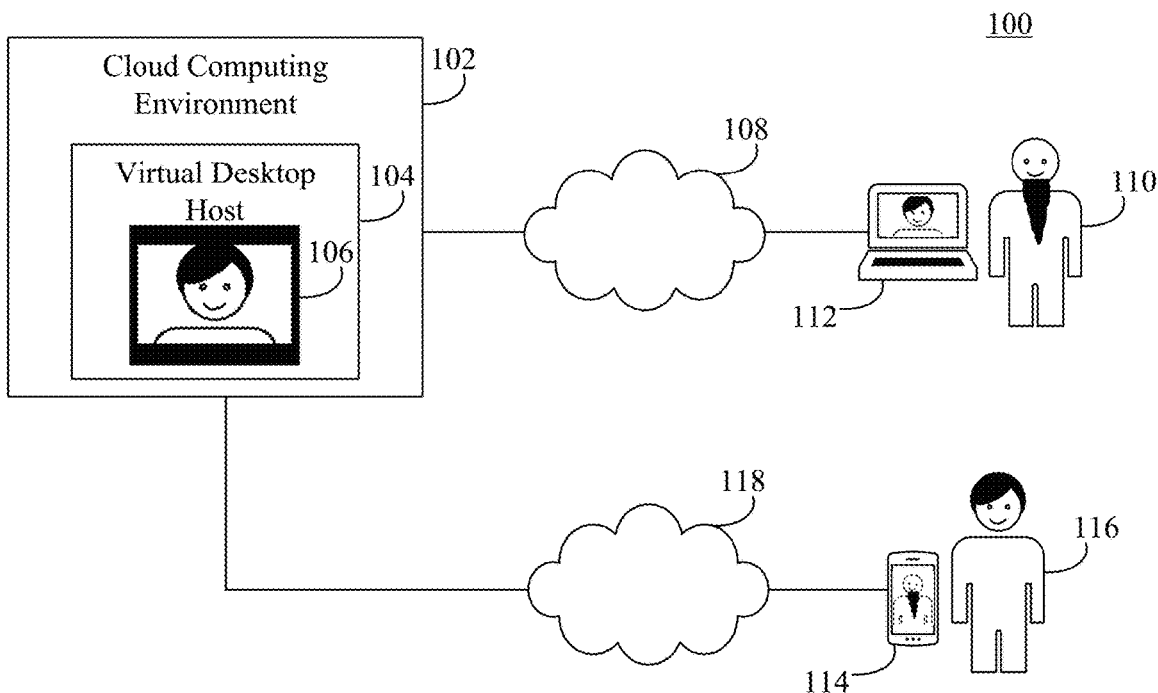
FIG. 1 depicts a block diagram of an example system for enabling video and/or audio communication via a communications application executing in a cloud computing environment, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Virtualization technology abstracts a desktop operating system (OS) and associated applications from a client computing device used to access them. For example, a virtual desktop infrastructure solution (VDI) may involve hosting a desktop on servers in a data center and delivering an image of the desktop over a network to the client computing device. The desktop image can then be rendered on the client computing device and a user of the client computing device may interact directly with the image as though the desktop and its applications are running locally on the client computing device.

This approach enables customers to streamline management and costs by consolidating and centralizing user desktops. The benefits of centralization include hardware resource optimization, reduced software maintenance, and improved security. For example, software patching and OS migrations can be applied and tested for all users in one instance. Moreover, software assets are centralized and thereby easily monitored and protected, and sensitive data is uncompromised in cases of desktop loss or theft. In addition, desktop virtualization increases users' mobility and the freedom to access virtual desktops from anywhere and any device.

Despite the many benefits afforded by virtualization technologies, some applications, however, may not be optimized for or well-supported in VDI environments. One such example is communications applications running in a VDI environment that enable real-time communications (RTC) between users (e.g., Microsoft® Teams, Slack®). RTC as described herein refers to near simultaneous exchange of information (e.g., voice, instant messaging, video, etc.) over a network from the sender to the receiver with negligible latency.

For example, FIG. 1 depicts a block diagram of an example system 100 for enabling video and/or audio communication via a communications application executing in a cloud computing environment. As shown in FIG. 1, system 100 includes a cloud computing environment 102 that includes a virtual desktop host 104, a client device 112, and a remote computing device 114.

For illustration purposes, cloud computing environment 102 is shown to include only a single virtual desktop host 104 but may include any number of resources. For example, cloud computing environment 102 may be comprised of resources (e.g., servers) running within one or more cloud data centers and/or on-premises with respect to an enterprise or organization. Additionally, in embodiments, cloud computing environment 102 may include any type and number of other resources including resources that facilitate communications with and between servers (e.g., network switches, networks, etc.), storage by servers (e.g., storage devices, etc.), resources that manage other resources (e.g., hypervisors that manage virtual machines to present a virtual operating platform for tenants of a multi-tenant cloud, etc.), and/or further types of resources. In some embodiments, virtual desktop host 104 may comprise a remote server or virtual machine accessible in a data center or an on-premises server.

In addition, client computing device 112 and remote computing device 114, although respectively pictured as a laptop and a smart phone, may be any type of a mobile or stationary computing device. Example mobile computing devices include but are not limited to a Microsoft® Surface® device, a personal digital assistant (PDA), a thin client, a laptop computer, a notebook computer, a tablet computer such as an Apple iPad™, a netbook, a mobile phone, a portable gaming device, or a wearable computing device. Example stationary computing devices include but are not limited to a desktop computer or PC (personal computer), a gaming console, or a server.

As further shown in FIG. 1, client computing device 112 is communicatively coupled to cloud computing environment 102 via a network 108, and remote computing device 114 is communicatively coupled to cloud computing environment 102 via a network 118. Networks 108 and 118 may comprise one or more networks such as local area networks (LANs), wide area networks (WANs), enterprise networks, the Internet, etc., and may include one or more of wired and/or wireless portions. In certain scenarios, network 108 and network 118 may comprise the same network.

Client computing device 112, remote computing device 114, and virtual desktop host 104 may include at least one network interface that enables communications over networks 108 and 118. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Client computing device 112 also includes a remote desktop client that is configured to present within a user interface of client computing device 112 a user interface 106 of a communications application that provides for video and/or audio communication between users thereof and runs on virtual desktop host 104. For instance, data associated with user interface 106 of the communications application may be transferred to client computing device 112 and rendered as a user interface in a screen display of client computing device 112. Any interactions (e.g., mouse and/or keyboard inputs) that a user 110 may have with the user interface on client computing device 112 that is presenting user interface 106 of the communications application may be tracked and transmitted to virtual desktop host 104.

More specifically, user 110 may initiate a video and/or audio communication with a user 116 of remote computing device 114 by interacting with the user interface of client computing device 112 (e.g., by clicking a "phone icon" next to a contact displayed in a user interface). This interaction may be provided to virtual desktop host 104, and the communications application running on virtual desktop host 104 may initiate and perform the video and/or audio communication with user 116.

In embodiments, during the video and/or audio communication between user 110 and user 116, device sources (such as a video camera) on client computing device 112 and remote computing device 114 may capture images appearing in front of the device sources. As depicted in FIG. 1, video captured of users 110 and 116 may be transferred through virtual desktop host 104 to the computing device of the other user for presenting on a display screen of the other user's computing device. For instance, video of user 116 captured by the device source on remote computing device 114 may be transferred to virtual desktop host 104 and processed (e.g., decoded) on virtual desktop host 104 and rendered locally as part of user interface 106 of the communications application. In some embodiments, screen scraping may be used to collect screen display data associated with the video of user 116 rendered in user interface 106 for rendering the video of user 116 in the user interface of client computing device 112 so that user 110 may contemporaneously view the video of user 116 as it is captured by a device source.

This video and/or audio communication approach described above with reference to FIG. 1 may create latency issues (especially for high resolution video and audio experiences) as video and/or audio communication between client computing device 112 and remote computing device 114 is transferred through network 108, virtual desktop host 104, and network 118. Moreover, this approach may increase the amount of time and resources spent on processing the media. For example, when virtual desktop host 104 receives media, it may need to be decoded and when virtual desktop host 104 transmits the media, it may need to be encoded.

Figure 2:
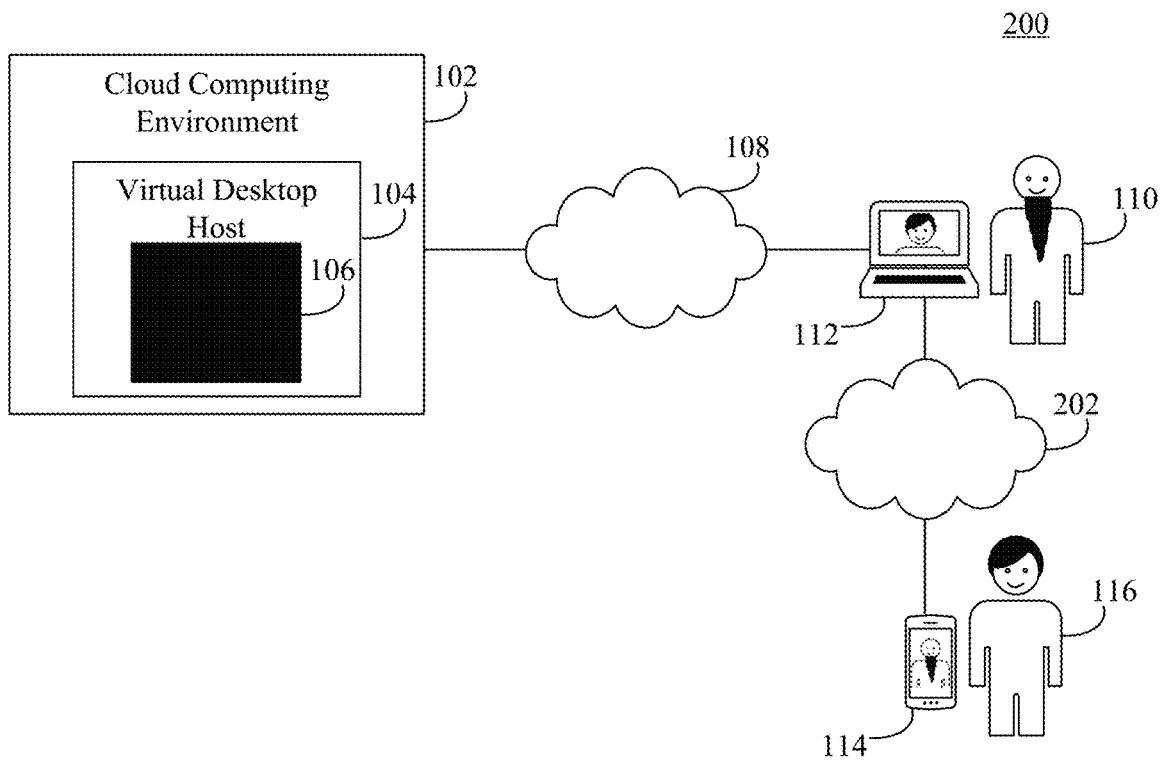
FIG. 2 depicts a block diagram of an example system for enabling peer-to-peer audio and/or video communication between a client computing device and a remote computing device as opposed to audio and/or video communication therebetween via a communications application, according to an example embodiment.

Implementing a peer-to-peer video and/or audio communication approach between client computing device 112 and remote computing device 114 may alleviate the latency issues discussed above as well as reduce the processing workload on virtual desktop host 104. For example, FIG. 2 depicts a block diagram of an example system 200 for enabling peer-to-peer audio and/or video communication between a client computing device interacting with a communications application in the cloud and a remote computing device.

As described above with reference to FIG. 1, user 110 may initiate a video and/or audio communication with user 116 of remote computing device 114 by interacting with the user interface of client computing device 112. This interaction may be provided to virtual desktop host 104 and prompt the communications application running on virtual desktop host 104 to initiate the media communication with remote computing device 114. However, in FIG. 2, the media communication call may be intercepted and redirected to client computing device 112 to enable peer-to-peer media communication between client computing device 112 and remote computing device 114. The remote desktop client of client computing device 112 is configured to receive the redirected communication from the communications application for the purposes of enabling peer-to-peer audio and/or video communication between client computing device 112 and remote computing device 114.

Once client computing device 112 and remote computing device 114 are connected for the purposes of audio and/or video communication (a process that will be described in more detail below with reference to FIGS. 4 and 5), client computing device 112 and remote computing device 114 may communicate video and/or audio with each other via a network 202 (which may be the same as, similar to, or entirely different from networks 108 and 118 of FIG. 1).

By enabling peer-to-peer audio and/or video communication between client computing device 112 and remote computing device 114, media communication through virtual desktop host 104 is avoided, thereby reducing latency associated with such audio and/or video communication and also reducing a processing burden on virtual desktop host 104. Furthermore, as part of shifting the media communication connection between client computing device 112 and remote computing device 114 to a peer-to-peer channel, embodiments described herein also enable local hardware-based media processing capabilities (e.g., a hardware-based video or audio codec) of client computing device 112 to be discovered and leveraged by the remote desktop client to better carry out such communication. As used herein, the term media is to be understood to encompass at least video, audio or a combination thereof. Because such embodiments can leverage the hardware-based media processing capabilities of client computing device 112, the quality and efficiency of media processing by client computing device 112 can be improved as compared to a software-based media processing approach. Moreover, utilizing such hardware-based media processing capabilities of client computing device 112 can reduce a burden on a processor of client computing device 112 which will not need to run a corresponding software-based media processing capability instead.

Figure 3:
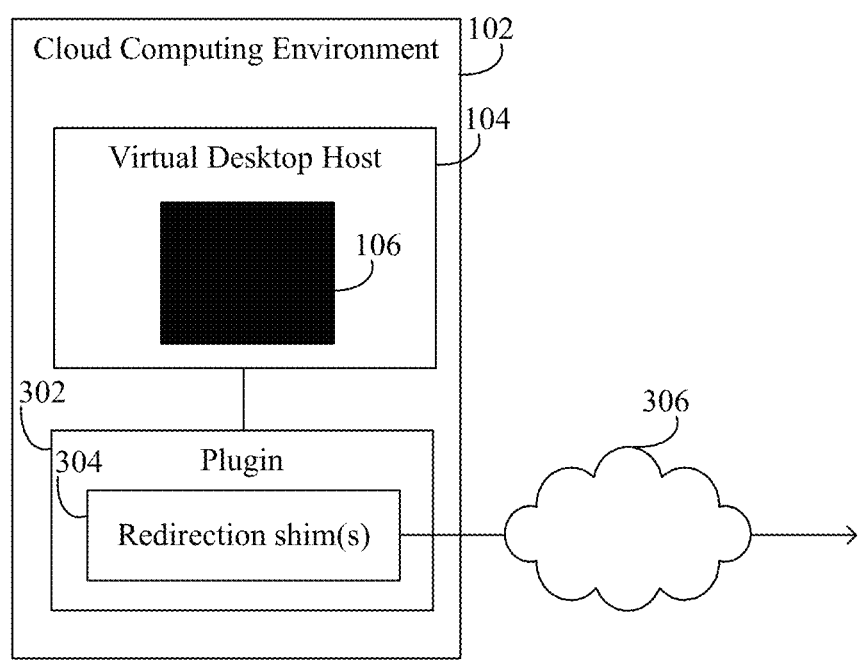
FIG. 3 depicts a block diagram of an example system including a plugin that enables redirection of communication from a communications application for the purposes of enabling peer-to-peer audio and/or video communication between a client computing device and a remote computing device, according to an example embodiment.

FIG. 3 will now be described, with continued reference to FIGS. 1 and 2, to help illustrate the process of redirecting communication from the communications application running on virtual desktop host 104 to client computing device 112. FIG. 3 depicts a block diagram of an example system 300 for enabling redirection of communication from a communications application for the purposes of enabling peer-to-peer audio and/or video communication between a client computing device and a remote computing device.

As shown in FIG. 3, cloud computing environment 102 includes virtual desktop host 104 and a plugin 302. As further shown in FIG. 3, plugin 302 includes redirection shim(s) 304. Redirection shim(s) 304 are configured to intercept communication (e.g., API calls) initiated by the communications application running on virtual desktop host 104 and redirect such calls to client computing device 112 via network 108. For example, if the communications application initiates video and/or audio communication with remote computing device 114, then redirection shim(s) 304 will intercept the video and/or audio communication request, modify the request if necessary (e.g., replacing certain script objects with different implementations), and redirect it to client computing device 112 over a communication channel 306 (via network 108).

In an embodiment, the communications application may load plugin 302 at runtime if particular conditions are met (e.g., if the communications application is running on a particular virtual desktop environment and if multi-session users is enabled). Once loaded, plugin 302 may attempt to establish communication channel 306 (e.g., establish a dynamic virtual channel (DVC)) with client computing device 112 to enable communication between virtual desktop host 104 and client computing device 112. In embodiments, plugin 302 may make Remote Procedure calls (RPCs) through a WebSockets server process to client computing device 112.

To provide a more detailed perspective of client computing device 112, FIG. 4 will now be described. FIG. 4 depicts client computing device 112 including a plugin 404 to a remote desktop client 402 that enables peer-to-peer communication between client computing device 112 and a remote computing device, determines a hardware-based media processing capability of client computing device 112, and uses the detected hardware-based media processing capability to process media. Plugin 404 comprises a set of components 432 that are non-OS specific and compatible with any platform and a set of components 430 that are OS specific and would need to be reimplemented for each platform. Set of components 432 that are non-OS specific comprises: an RTC listener 406, an RTC manager 408, a window manager 410, and an RTC component 412.

Figure 4:
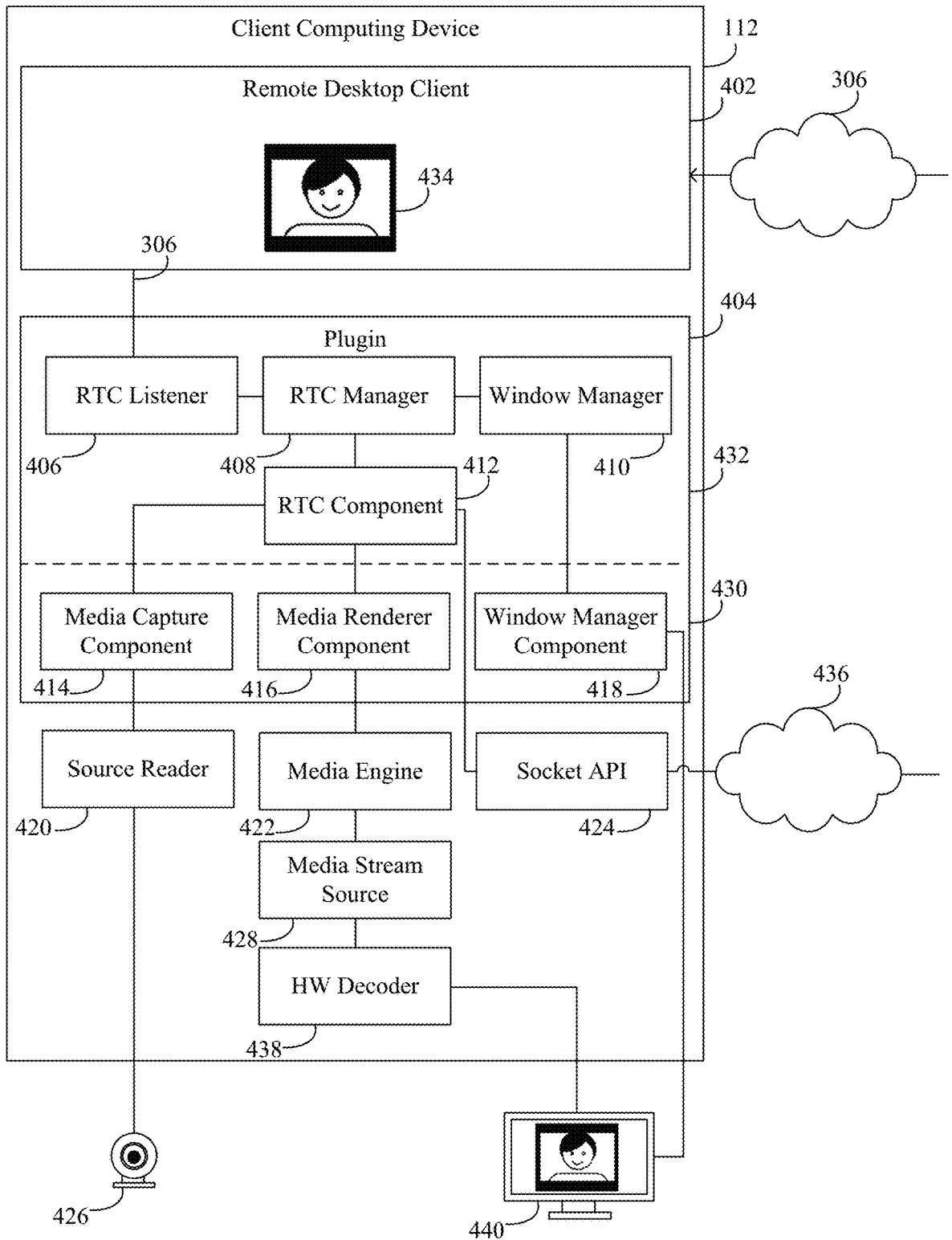
FIG. 4 depicts a block diagram of a client computing device including a plugin to a remote desktop client that determines a hardware-based media processing capability of client computing device and uses the detected hardware-based media processing capability to process media, according to another an example embodiment.
Figure 5:
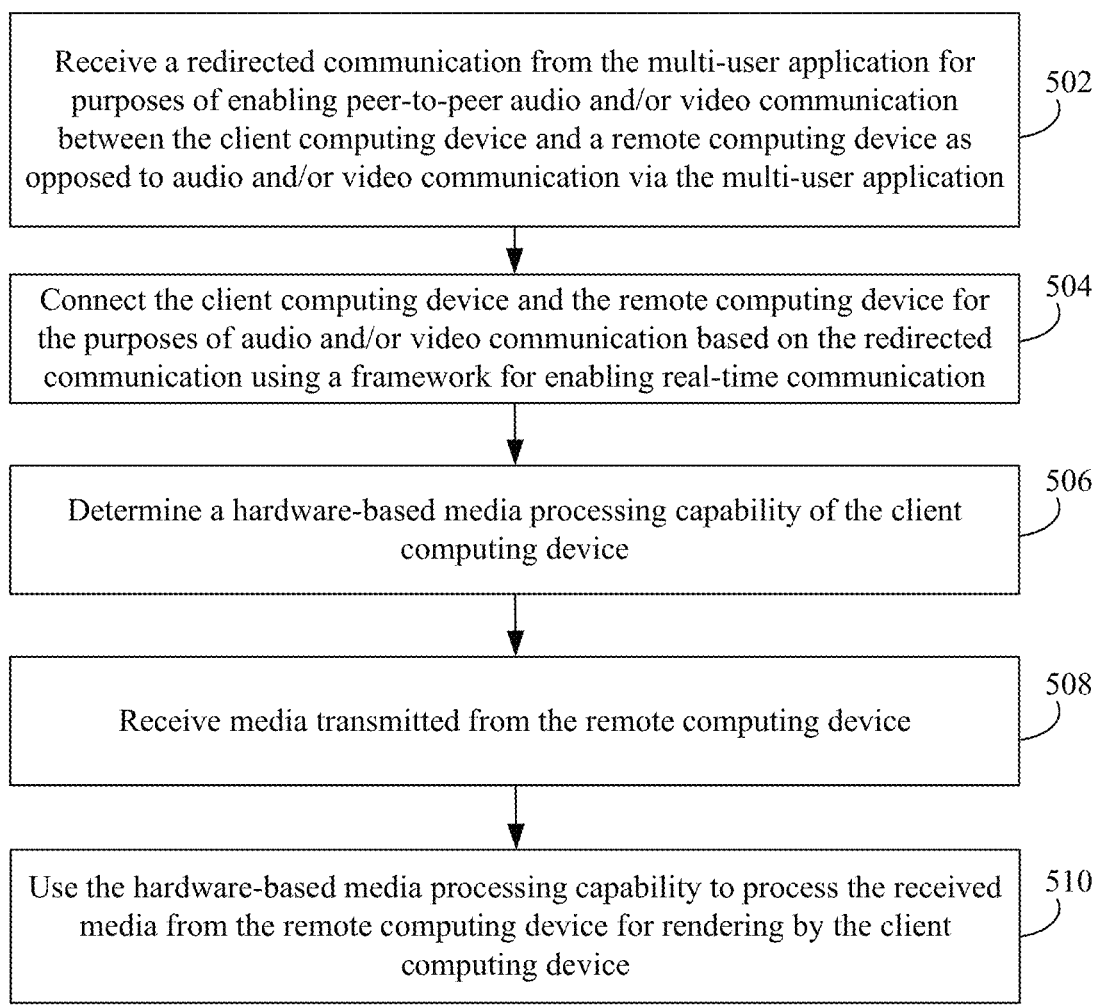
FIG. 5 shows a flowchart of a method for determining a hardware-based media processing capability of a client computing device and using the detected hardware-based media processing capability to process media, according to an example embodiment.

As further shown in FIG. 4, client computing device 112 also includes a remote desktop client 402. As previously described, remote desktop client 402 of client computing device 112 is configured to receive redirected communication on communication channel 306 from the communications application (i.e., through plugin 302 of cloud computing environment 102 in FIG. 3) for the purposes of enabling peer-to-peer audio and/or video communication between client computing device 112 and a remote computing device (e.g., remote computing device 114 in FIGS. 1 and 2).

In the process of enabling peer-to-peer communication between client computing device 112 and remote computing device 114, RTC listener 406 is configured to listen on communication channel 306 for the redirected communication and provide a stream of the redirected communication to RTC manager 408 once received. RTC manager 408 is configured to receive the stream of redirected communication (e.g., including serialized RPC call information) and translate it into a format compatible with a framework for enabling real-time communication (e.g., WebRTC). RTC manager 408 then provides the translated communication (e.g., WebRTC API calls) to RTC component 412. RTC component 412 is configured to connect client computing device 112 and remote computing device 114 for the purposes of audio and/or video communication based on the translated communication (e.g., WebRTC API calls) provided from RTC manager 408. RTC component 412 may establish a communication channel 436 between client computing device 112 and remote computing device 114 for the purposes of audio and/or video communication.

Set of components 430 of plugin 404 that are OS specific comprise: a media capture component 414, a media renderer component 416, and a window manager component 418. After client computing device 112 and remote computing device 114 are connected for audio and/or video communication, media capture component 414 and media renderer component 416 may be used to detect a hardware-based media processing capability of client computing device 112 and use the hardware-based media processing capability to optimize audio and/or video communication between client computing device 112 and remote computing device 114.

For example, media capture component 414 may determine a hardware-based media processing capability of client computing device 112 by using OS-specific APIs to determine what is available on client computing device 112. After determining what is available on client computing device 112, media capture component 414 is configured to inform a source reader 420 of any information (such as formatting) related to processing of captured media and any configuring of hardware needed to leverage the hardware-based media processing capability to process captured media. Source reader 420 is configured to capture media from a video camera 426 and other device sources (e.g., a microphone) of client computing device 112.

To help illustrate, say media capture component 414 determines that client computing device 112 has a hardware-based media processing capability to transcode captured video to a lower resolution/quality. Media capture component 414 may inform source reader 420 that the original captured media needs to be decoded to an intermediate uncompressed format (e.g., PCM for audio or YUV for video) and then encoded into a target format. Source reader 420 may then perform the transcoding and provide the processed video to media capture component 414. In capturing video, source reader 420 may act like a frame server and stream captured video to media capture component 414.

Media capture component 414 is further configured to receive from source reader 420 processed and/or unprocessed media captured from video camera 426 and provide the captured media to RTC component 412. RTC component 412 is configured to prepare the captured media for transmission to remote computing device 114. As shown in FIG. 4, RTC component 412 may send the captured media through a socket API 424 over communication channel 436 to remote computing device 114.

Media renderer component 416 may determine a hardware-based media processing capability of client computing device 112 by using OS-specific APIs to determine what is available on client computing device 112. After determining what is available on client computing device 112, media renderer component 416 is configured to inform a media engine 422 of any information (such as formatting) related to processing of received media and any configuring of hardware needed to leverage the hardware-based media processing capability to process received media.

Media renderer component 416 is further configured to provide a specific source of media received from RTC component 412 to media engine 422. Media engine 422 will then build up a media pipeline and set it up for rendering. Media engine 422 is configured to provide the specific source (compressed or decompressed) to a media stream source 428. Media stream source 428 is configured to provide the media source to hardware needed to leverage the hardware-based media processing capability to process the received media. In an embodiment, media stream source 428 may use a frame server approach for producing video media.

As shown in FIG. 4, media stream source 428 is connected to a hardware decoder 438. In some embodiments, if the received media is compressed, then hardware decoder 438 may decode the received media. Additionally, media stream source 428 may provide the received media to other hardware-based media processing capabilities, such as hardware-accelerated video processing (e.g., resizing the frames, color conversions, etc.) or hardware-accelerated audio processing. As depicted in FIG. 4, the processed media may be provided to remote desktop client 402 for rendering in its user interface 434. Alternatively or additionally, the processed media can be rendered at a display 440. Window manager 410 and window manager component 418 are configured to monitor and track any changes (e.g., window movements, window resizing, pop-up menus, etc.) needed to be performed on video rendered in user interface 434.

Client computing device 112 is described in further detail as follows with respect to FIGS. 5-7. FIG. 5 shows a flowchart 500 of a method for enabling peer-to-peer communication between a client computing device and a remote computing device, determining a hardware-based media processing capability of a client computing device, and using the detected hardware-based media processing capability to process media.

Flowchart 500 begins with step 502. In step 502, a redirected communication is received from the communications application for purposes of enabling peer-to-peer audio and/or video communication between the client computing device and a remote computing device as opposed to audio and/or video communication via the communications application. For example, and with continued reference to FIG. 4, remote desktop client 402 receives a redirected communication on communication channel 306 from the communications application for purposes of enabling peer-to-peer audio and/or video communication between client computing device 112 and remote computing device 114 as opposed to audio and/or video communication via the communications application.

In step 504, the client computing device and the remote computing device are connected for the purposes of audio and/or video communication based on the redirected communication using a framework for enabling real-time communication. For example, and with continued to FIG. 4, RTC component 412 connects client computing device 112 and remote computing device 114 for the purposes of audio and/or video communication based on the redirected communication using a framework for enabling real-time communication. In one embodiment, the redirected communication includes WebRTC API calls intercepted from the communications application and APIs and protocols of WebRTC is the framework used for connecting client computing device 112 and the remote computing device 114.

In step 506, a hardware-based media processing capability of the client computing device is determined. For example, and with continued to FIG. 4, media renderer component 416 determines a hardware-based media processing capability of client computing device 112 by using OS-specific APIs to determine what is available on client computing device 112. Such hardware-based media processing capability of client computing device 112 may comprise, for example and without limitation, a video codec (comprising a video decoder), an audio codec (comprising an audio decoder), hardware-accelerated video processing, or hardware-accelerated audio processing.

In step 508, media transmitted from the remote computing device is received. For example, and with continued to FIG. 4, media renderer component 416 receives media transmitted from remote computing device 114 from RTC component 412.

In step 510, the hardware-based media processing capability is used to process the received media from the remote computing device for rendering by the client computing device. For example, and with continued to FIG. 4, media stream source 428 uses the hardware-based media processing capability to process the received media from remote computing device 114 for rendering by client computing device 112. To help illustrate, media stream source 428 is connected to a hardware decoder 438. In some embodiments, if the received media is compressed, then hardware decoder 438 may decode the received media. Additionally, media stream source 428 may provide the received media to other hardware-based media processing capabilities, such as hardware-accelerated video processing (e.g., resizing the frames, color conversions, etc.) or hardware-accelerated audio processing.

Figure 6:
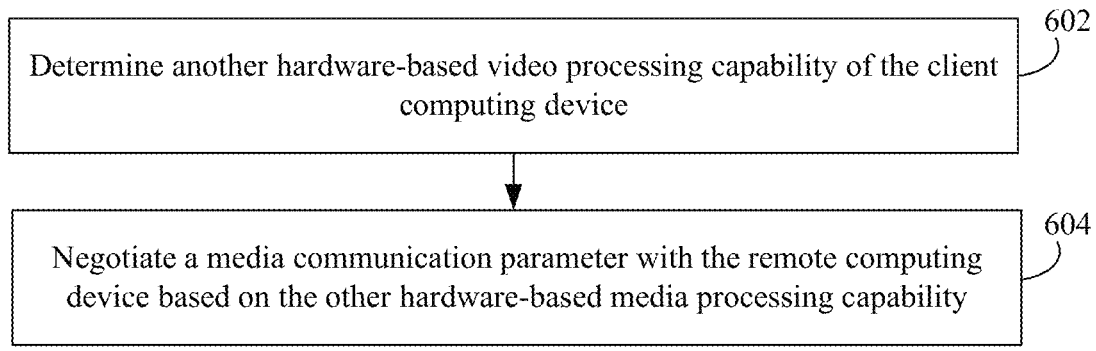
FIG. 6 shows a flowchart of a method for negotiating a media communication parameter with a remote computing device based on a determined hardware-based media processing capability of a client computing device, according to an example embodiment.

FIG. 6 shows a flowchart 600 of a method for negotiating a media communication parameter with a remote computing device based on a determined hardware-based media processing capability of a client computing device. Flowchart 600 begins with step 602. In step 602, another hardware-based video processing capability of the client computing device is determined. For example, and with continued to FIG. 4, RTC manager 408 may determine another hardware-based video processing capability of client computing device 112. RTC manager 408 may determine the other hardware-based media processing capability through an API of the framework for enabling real-time communication.

In step 604, a media communication parameter is negotiated with the remote computing device based on the other hardware-based media processing capability. For example, and with continued to FIG. 4, RTC manager 408 negotiates a media communication parameter with remote computing device 114 based on the other hardware-based media processing capability. For example, RTC manager 408 may determine that client computing device 112 has a particular decoder (e.g., VP9 decoder) that remote computing device 114 does not have. RTC manager 408 may negotiate with remote computing device 114 to provide media in a format compatible with its particular decoder.

Figure 7:
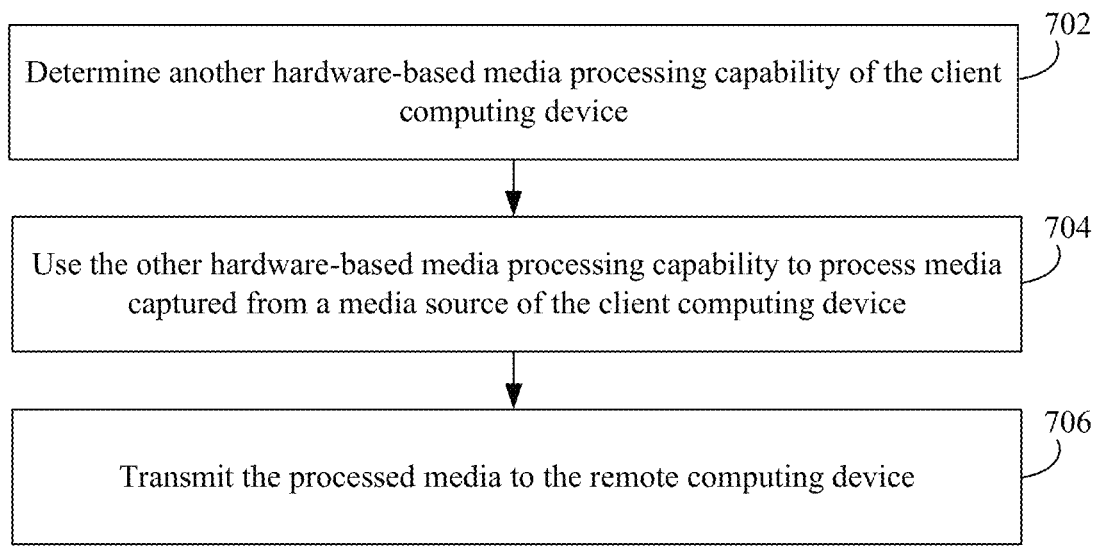
FIG. 7 shows a flowchart of a method for determining a hardware-based media processing capability of a client computing device and using the hardware-based media processing capability to process media captured from a media source of the client computing device, according to an example embodiment.

FIG. 7 shows a flowchart 700 of a method for determining a hardware-based media processing capability of a client computing device and using the hardware-based media processing capability to process media captured from a media source of the client computing device. Flowchart 700 begins with step 702. In step 702, another hardware-based media processing capability of the client computing device is determined. For example, and with continued to FIG. 4, media capture component 414 determines another hardware-based media processing capability of client computing device 112. Media capture component 414 may determine available hardware-based media processing capability of client computing device 112 by using APIs specific to the OS of client computing device 112. Such hardware-based media processing capability of client computing device 112 may comprise, for example and without limitation, a video codec (comprising a video encoder), an audio codec (comprising an audio encoder), hardware-accelerated video processing, or hardware-accelerated audio processing.

In step 704, the other hardware-based media processing capability is used to process media captured from a media source of the client computing device. For example, a hardware-based video or audio encoder may be used to encode video or audio, respectively, captured from a media source of client computing device 112. As another example, hardware-accelerated video or audio processing may be used to accelerate the processing of video or audio, respectively, captured from a media source of client computing device 112. In some embodiments, and with continued to FIG. 4, media capture component 414 is configured to inform source reader 420 of any information (such as formatting) related to processing of captured media and any configuring of hardware needed to leverage the hardware-based media processing capability to process captured media.

In step 706, the processed media is transmitted to the remote computing device. For example, and with continued to FIG. 4, RTC Component 412 transmits the processed media to remote computing device 114 over communication channel 436.

Although the foregoing embodiments refer to a communications application executing on a virtual desktop host, it is to be understood that the techniques described herein could be utilized in conjunction with any communications application that is executing remotely from client computing device 112, regardless of whether such communications application is running on a virtual desktop or some other type of platform. That is to say, the embodiments described herein are not limited to communications applications being executed on a virtual desktop but instead broadly encompass any type of communications application that may execute on a server and that enable audio and/or video communication between remotely-located users and user devices.

Furthermore, although the foregoing embodiments refer to a remote desktop and associated plugin running on client computing device 112, it is to be understood that the functionality provided by those components could be encapsulated within any type of software components having any type of structure or architecture. For example, the functions and features of plugin 404 may be included in a software component that isn't necessarily a plugin but is instead some other type of software component that is operable to work with remote desktop client 402. Furthermore, the functions and features of plugin 404 may also be integrated directly into remote desktop client 402 such that an additional software component is not required beyond remote desktop client 402. Still further, the function and features of remote desktop client 402 and plugin 404 may be included in an application or operating system component of client computing device 112 that isn't referred to as a remote desktop client or plugin but nevertheless provides similar capabilities to those components as were described herein.

III. Example Computer System Implementation

Cloud computing environment 102, virtual desktop host 104, plugin 302, client computing device 112, remote desktop client 402, plugin 404, flowchart 500, flowchart 600, and/or flowchart 700 may be implemented in hardware, or hardware combined with one or both of software and/or firmware. For example, cloud computing environment 102, virtual desktop host 104, plugin 302, client computing device 112, remote desktop client 402, plugin 404, flowchart 500, flowchart 600, and/or flowchart 700 may be implemented as computer program code/instructions configured to be executed in one or more processors and stored in a computer readable storage medium. In another embodiment, cloud computing environment 102, virtual desktop host 104, plugin 302, client computing device 112, remote desktop client 402, plugin 404, flowchart 500, flowchart 600, and/or flowchart 700 may also be implemented in hardware that operates software as a service (SaaS) or platform as a service (PaaS). Alternatively, cloud computing environment 102, virtual desktop host 104, plugin 302, client computing device 112, remote desktop client 402, plugin 404, flowchart 500, flowchart 600, and/or flowchart 700 may be implemented as hardware logic/electrical circuitry.

For instance, in an embodiment, one or more, in any combination, of cloud computing environment 102, virtual desktop host 104, plugin 302, client computing device 112, remote desktop client 402, plugin 404, flowchart 500, flowchart 600, and/or flowchart 700 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
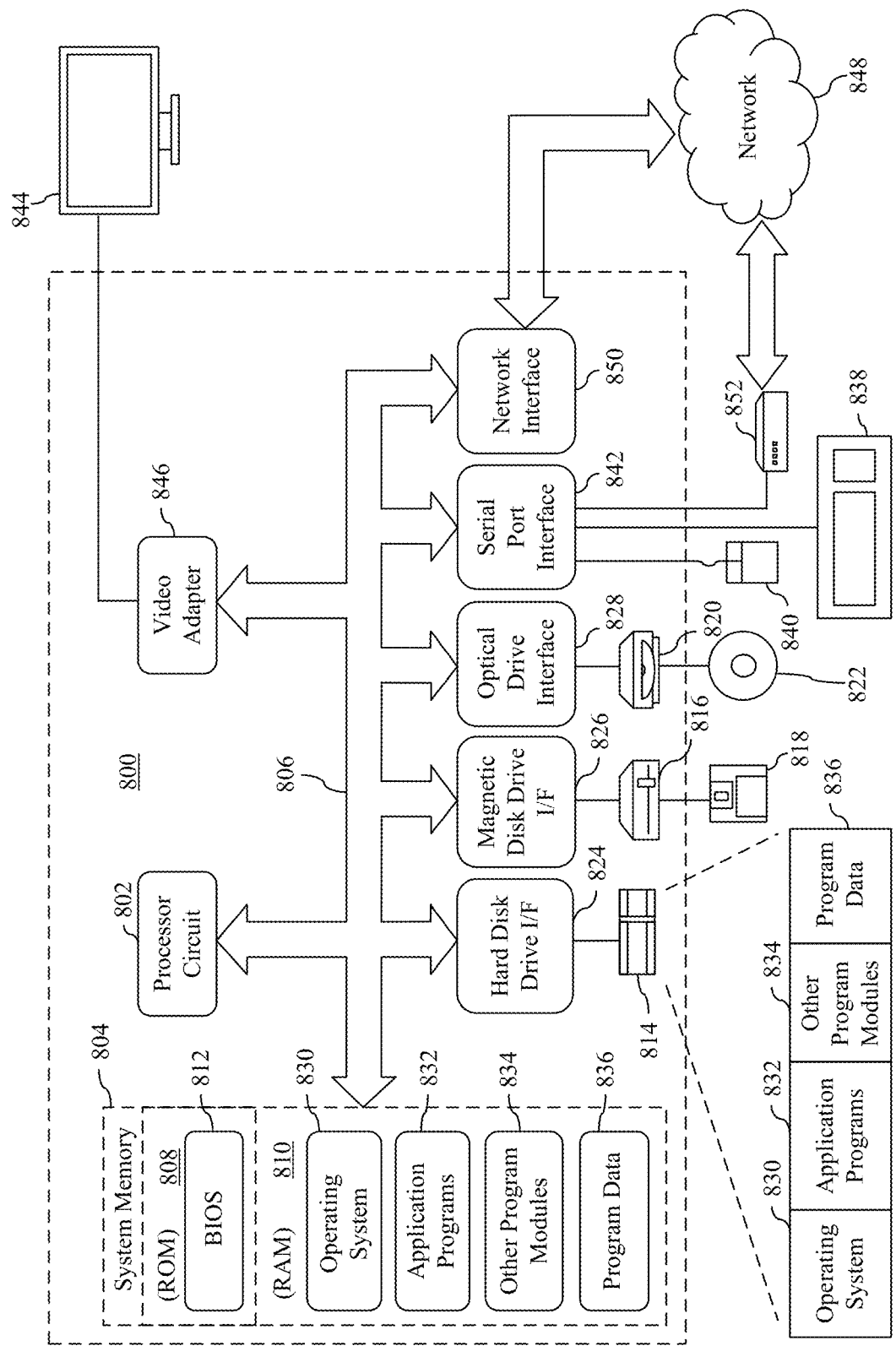
FIG. 8 is a block diagram of an example processor-based computer system that may be used to implement various embodiments.

FIG. 8 depicts an exemplary implementation of a computing device 800 in which embodiments may be implemented. For example, components of cloud computing environment 102, virtual desktop host 104, plugin 302, client computing device 112, remote desktop client 402, plugin 404 may each be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing virtual desktop host 104, plugin 302, remote desktop client 402, plugin 404, flowchart 500, flowchart 600, and/or flowchart 700 (including any suitable step of flowcharts 500, 600, and 700), and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers. Display screen 844, and/or any other peripheral output devices (not shown) may be used for implementing user interfaces 106 and 434, and/or any further embodiments described herein.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In a first embodiment, a client computing device, comprises: one or more processors; one or more memory devices that store computer program logic for execution by the one or more processors, the computer program logic comprising: a remote desktop client that is configured to present a user interface of a communications application executing in a cloud computing environment within a user interface of the client computing device, the remote desktop client being further configured to receive redirected communication from the communications application for the purposes of enabling peer-to-peer audio and/or video communication between the client computing device and a remote computing device as opposed to audio and/or video communication via the communications application; and a plugin, comprising: a real-time communication manager configured to receive the redirected communication from the remote desktop channel component and translate the redirected communication into a format compatible with a framework for enabling real-time communication; a real-time communication component configured to connect the client computing device and the remote computing device for the purposes of audio and/or video communication based on the translated communication; and a media capture component configured to determine a hardware-based media processing capability of the client computing device, use the hardware-based media processing capability to process media captured from a media source of the client computing device, and provide the processed media to the real-time communication component to be transmitted to the remote computing device.

In an embodiment, the media comprises one of video or audio.

In an embodiment, the real-time communication manager is further configured to: determine another hardware-based video processing capability of the client computing device; and negotiate a media communication parameter with the remote computing device based on the other hardware-based media processing capability.

In an embodiment, the media capture component determines the hardware-based media processing capability through an application programming interface (API) of an operating system of the client computing device and the real-time communication manager determines the other hardware-based media processing capability through an API of the framework for enabling real-time communication.

In an embodiment, the plugin further comprises a media renderer component configured to receive media transmitted from the remote computing device via the real-time communication component and provide the received media to a media engine of the client computing device for rendering within the user interface of the client computing device, the video renderer component being further configured to: determine another hardware-based media processing capability of the client computing device; and use the other media processing capability to process the received media from the remote computing device.

In an embodiment, the hardware-based media processing capability comprises one of a video codec or an audio codec.

In an embodiment, the hardware-based media processing capability comprises one of hardware-accelerated video processing or hardware-accelerated audio processing.

In another embodiment, a method executed by one or more processors of a client computing device that is presenting a user interface of a communications application executing in a cloud computing environment, comprises: receiving a redirected communication from the communications application for purposes of enabling peer-to-peer audio and/or video communication between the client computing device and a remote computing device as opposed to audio and/or video communication via the communications application; connecting the client computing device and the remote computing device for the purposes of audio and/or video communication based on the redirected communication using a framework for enabling real-time communication; determining a hardware-based media processing capability of the client computing device; receiving media transmitted from the remote computing device; and using the hardware-based media processing capability to process the received media from the remote computing device for rendering by the client computing device.

In an embodiment, the media comprises one of video or audio.

In an embodiment, the method further comprises: determining another hardware-based video processing capability of the client computing device; and negotiating a media communication parameter with the remote computing device based on the other hardware-based media processing capability.

In an embodiment, the determining the hardware-based media processing capability comprises determining the hardware-based media processing capability using an application programming interface (API) of an operating system of the client computing device; and wherein determining the other hardware-based media processing capability comprises determining the other hardware-based media processing capability using an API of the framework for enabling real-time communication.

In an embodiment, the method further comprises: determining another hardware-based media processing capability of the client computing device; using the other hardware-based media processing capability to process media captured from a media source of the client computing device; and transmitting the processed media to the remote computing device.

In an embodiment, the hardware-based media processing capability comprises one of a video codec or an audio codec.

In an embodiment, the hardware-based media processing capability comprises one of hardware-accelerated video processing or hardware-accelerated audio processing.

In another embodiment, a computer-readable storage medium having program instructions recorded thereon that, when executed by at least one processor of a client computing device that is presenting a user interface of a communications application executing in a cloud computing environment, causes the at least one processor to perform a method comprises: receiving a redirected communication from the communications application purposes of enabling peer-to-peer audio and/or video communication between the client computing device and a remote computing device as opposed to audio and/or video communication via the communications application; connecting the client computing device and the remote computing device for the purposes of audio and/or video communication based on the redirected communication using a framework for enabling real-time communication; determining a hardware-based media processing capability of the client computing device; and negotiating a media communication parameter with the remote computing device based on the hardware-based media processing capability.

In an embodiment, the media comprises one of video or audio.

In an embodiment, the method further comprises: determining another hardware-based video processing capability of the client computing device; and receiving media transmitted from the remote computing device; and using the other hardware-based media processing capability to process the received media from the remote computing device for rendering by the client computing device.

In an embodiment, the method further comprises: determining another hardware-based media processing capability of the client computing device; using the other hardware-based media processing capability to process media captured from a media source of the client computing device; and transmitting the processed media to the remote computing device.

In an embodiment, the hardware-based media processing capability comprises one of a video codec or an audio codec.

In an embodiment, the hardware-based media processing capability comprises one of hardware-accelerated video processing or hardware-accelerated audio processing.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:
1. A client computing device, comprising:
one or more processors;
one or more memory devices that store computer program logic for execution by the one or more processors, the computer program logic comprising:

a remote desktop client that is configured to present a user interface of a communications application executing in a cloud computing environment within a user interface of the client computing device, the remote desktop client being further configured to receive redirected communication from the communications application for the purposes of enabling peer-to-peer audio and/or video communication between the client computing device and a remote computing device as opposed to audio and/or video communication via the communications application; and a plugin, comprising:
 a real-time communication manager configured to receive the redirected communication from the remote desktop client and translate the redirected communication into a format compatible with a framework for enabling real-time communication;
 a real-time communication component configured to connect the client computing device and the remote computing device for the purposes of audio and/or video communication based on the translated communication; and
 a media capture component configured to determine a hardware-based media processing capability of the client computing device by using an application programming interface (API) specific to an operating system (OS) of the client computing device, use the hardware-based media processing capability to process media captured from a media source of the client computing device, and provide the processed media to the real-time communication component to be transmitted to the remote computing device, the hardware-based media processing capability comprising one of a video codec, an audio codec, hardware-accelerated video processing or hardware-accelerated audio processing.

2. The client computing device of claim 1, wherein the media comprises one of video or audio.

3. The client computing device of claim 1, wherein the real-time communication manager is further configured to:
 determine another hardware-based video processing capability of the client computing device; and
 negotiate a media communication parameter with the remote computing device based on the other hardware-based media processing capability.

4. The client computing device of claim 3, wherein the real-time communication manager determines the other hardware-based media processing capability through an API of the framework for enabling real-time communication.

5. The client computing device of claim 1, wherein the plugin further comprises a media renderer component configured to receive media transmitted from the remote computing device via the real-time communication component and provide the received media to a media engine of the client computing device for rendering within the user interface of the client computing device, the video renderer component being further configured to:
 determine another hardware-based media processing capability of the client computing device; and
 use the other media processing capability to process the received media from the remote computing device.

6. The client computing device of claim 1, wherein the redirected communication includes Web real-time communication (WebRTC) API calls intercepted from the communications application and wherein the framework for enabling real time communication comprises APIs and protocols of WebRTC.

7. The client computing device of claim 1, wherein the hardware-based media processing capability comprises one of the video codec or the audio codec and wherein the media capture component is configured to inform a source reader of information related to configuring the video codec or the audio codec of the client computing device to process the media captured from the media source of the client computing device.

8. The client computing device of claim 1, wherein the hardware-based media processing capability comprises one of the hardware-accelerated video processing or the hardware-accelerated audio processing and wherein the media capture component is configured to inform a source reader of information related to configuring the hardware-accelerated video processing or the hardware-accelerated audio processing to process the media captured from the media source of the client computing device.

9. A method executed by one or more processors of a client computing device that is presenting a user interface of a communications application executing in a cloud computing environment, comprising:
 receiving a redirected communication from the communications application for purposes of enabling peer-to-peer audio and/or video communication between the client computing device and a remote computing device as opposed to audio and/or video communication via the communications application;
 connecting the client computing device and the remote computing device for the purposes of audio and/or video communication based on the redirected communication using a framework for enabling real-time communication;
 determining, by a media capture component of a plugin executing on the client computing device and using an application programming interface (API) specific to an operating system (OS) of the client computing device, a hardware-based media processing capability of the client computing device, the hardware-based media processing capability comprising one of a video codec, an audio codec, hardware-accelerated video processing or hardware-accelerated audio processing;
 receiving media transmitted from the remote computing device; and
 using the hardware-based media processing capability to process the received media from the remote computing device for rendering by the client computing device.

10. The method of claim 9, wherein the media comprises one of video or audio.

11. The method of claim 9, further comprising:
 determining another hardware-based video processing capability of the client computing device; and
 negotiating a media communication parameter with the remote computing device based on the other hardware-based media processing capability.

12. The method of claim 11, wherein determining the other hardware- based media processing capability comprises determining the other hardware-based media processing capability using an API of the framework for enabling real-time communication.

13. The method of claim 9, further comprising:
 determining another hardware-based media processing capability of the client computing device;

using the other hardware-based media processing capability to process media captured from a media source of the client computing device; and transmitting the processed media to the remote computing device.

14. The method of claim 9, wherein the redirected communication includes Web real-time communication (WebRTC) API calls intercepted from the communications application and wherein the framework for enabling real-time communication comprises APIs and protocols of WebRTC.

15. The method of claim 9, wherein the hardware-based media processing capability comprises one of the video codec or the audio codec and wherein using the hardware-based media processing capability to process the received media from the remote computing device for rendering by the client computing device comprises using the video codec or the audio codec to decode the received media.

16. A computer-readable storage medium having program instructions recorded thereon that, when executed by at least one processor of a client computing device that is presenting a user interface of a communications application executing in a cloud computing environment, causes the at least one processor to perform a method comprising:

receiving a redirected communication from the communications application purposes of enabling peer-to-peer audio and/or video communication between the client computing device and a remote computing device as opposed to audio and/or video communication via the communications application;

connecting the client computing device and the remote computing device for the purposes of audio and/or video communication based on the redirected communication using a framework for enabling real-time communication;

determining, by a media capture component of a plugin executing on the client computing device and using an application programming interface (API) specific to an operating system (OS) of the client computing device, a hardware-based media processing capability of the client computing device by, the hardware-based media processing capability comprising one of a video codec, an audio codec, hardware-accelerated video processing or hardware-accelerated audio processing; and negotiating a media communication parameter with the remote computing device based on the hardware-based media processing capability.

17. The computer-readable storage medium of claim 16, wherein the media comprises one of video or audio.

18. The computer-readable storage medium of claim 16, wherein the method further comprises:

determining another hardware-based video processing capability of the client computing device; and receiving media transmitted from the remote computing device; and using the other hardware-based media processing capability to process the received media from the remote computing device for rendering by the client computing device.

19. The computer-readable storage medium of claim 16, wherein the method further comprises:

determining another hardware-based media processing capability of the client computing device;

using the other hardware-based media processing capability to process media captured from a media source of the client computing device; and transmitting the processed media to the remote computing device.

20. The computer-readable storage medium of claim 16, wherein the redirected communication includes Web real-time communication (WebRTC) API calls intercepted from the communications application and wherein the framework for enabling real- time communication comprises APIs and protocols of WebRTC.

* * * * *